(12) United States Patent
Graziosi

(10) Patent No.: US 11,190,803 B2
(45) Date of Patent: Nov. 30, 2021

(54) POINT CLOUD CODING USING HOMOGRAPHY TRANSFORM

(71) Applicant: SONY CORPORATION, Tokyo (JP)

(72) Inventor: Danillo Graziosi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/525,175

(22) Filed: Jul. 29, 2019

(65) Prior Publication Data

US 2020/0236401 A1 Jul. 23, 2020

Related U.S. Application Data

(60) Provisional application No. 62/794,091, filed on Jan. 18, 2019.

(51) Int. Cl.

| H04N 19/61 | (2014.01) |
|---|---|
| H04N 19/20 | (2014.01) |
| H04N 19/18 | (2014.01) |
| H04N 19/17 | (2014.01) |
| G06T 7/536 | (2017.01) |

(52) U.S. Cl.
CPC ............ *H04N 19/61* (2014.11); *G06T 7/536* (2017.01); *H04N 19/17* (2014.11); *H04N 19/18* (2014.11); *H04N 19/20* (2014.11)

(58) Field of Classification Search
CPC ...... H04N 19/20; H04N 13/00; H04N 13/161; H04N 13/239; H04N 13/282; H04N 13/296; H04N 13/344; H04N 19/132; H04N 19/167; H04N 19/17; H04N 19/46; H04N 19/597; H04N 2013/0081; H04N 21/816; H04N 21/85406; G06T 15/04; G06T 9/001

See application file for complete search history.

(56) References Cited

U.S. PATENT DOCUMENTS

| 2005/0275663 | A1* | 12/2005 | Kokojima | ............... G06T 15/30 345/622 |
|---|---|---|---|---|
| 2012/0002014 | A1* | 1/2012 | Walsh | .................. G06T 19/006 348/47 |
| 2014/0043329 | A1* | 2/2014 | Wang | ................. G06K 9/00201 345/420 |
| 2018/0205963 | A1 | 7/2018 | Matei et al. | |
| 2018/0268570 | A1 | 9/2018 | Budagavi et al. | |
| 2019/0122393 | A1* | 4/2019 | Sinharoy | ............. G06K 9/6202 |

FOREIGN PATENT DOCUMENTS

CN 103414861 B 12/2016

* cited by examiner

*Primary Examiner* — Joon Kwon
(74) *Attorney, Agent, or Firm* — Haverstock & Owens LLP

(57) ABSTRACT

A method of point cloud coding using homography transform sends the homography transform of the 3D patches, instead of the explicit projection values (such as bounding boxes and patch orientation, rotation). The method has a more compact notation, is more efficient in terms of transmission, and allows for a faster decoding, particularly in cases where the 3D points will be reprojected.

21 Claims, 17 Drawing Sheets

$$P^{-1} = \begin{bmatrix} \dfrac{right - left}{2} & 0 & 0 & \dfrac{left + right}{2} \\ 0 & \dfrac{top - bottom}{2} & 0 & \dfrac{top + bottom}{2} \\ 0 & 0 & \dfrac{far - near}{-2} & \dfrac{far + near}{2} \\ 0 & 0 & 0 & 1 \end{bmatrix}$$

void patchFrameLayerUnit( PatchFrameLayerUnit& patchFrameLayerUnit, PatchSequenceParameterSet& patchSequenceParameterSet, PCCBitstream& bitstream );

| PSD_PFLU | |
|---|---|
| patch_frame_header(frCount) | patch_frame_data_unit_(frCount) |

```
class PatchFrameLayerUnit {
public:
private:
    uint8_t          frameIndex_;
    PatchFrameHeader patchFrameHeader_;
    PatchFrameDataUnit patchFrameDataUnit_;
};
```

Fig. 8

```
void patchFrameHeader(PatchSequenceParameterSet& psps, PatchFrameHeader& pfh, size_t frameIndex, PCCBitstream& bitstream);
```

| pfh_patch_frame_parameter_set_id[ frmIdx ] → ue(v) | pfh_address[ frmIdx ] → u(v) | pfh_type[ frmIdx ] → ue(v) | pfh_patch_frame_order_cnt_lsb[ frmIdx ] → u(v) | pfh_ref_patch_frame_list_idx[ frmIdx ] → u(v) | pfh_additional_pfoc_lsb_val[ frmIdx ][ j ] → u(v) | pfh_num_ref_idx_active_override_flag[ frmIdx ]

pfh_ref_patch_frame_list_sps_flag[ frmIdx ]

pfh_additional_pfoc_lsb_present_flag[ frmIdx ][ j ]

pfh_num_ref_idx_active_minus1[ frmIdx ] → ue(v)

if( pfh_type[ frmIdx ] == I ) {

| pfh_2d_shift_u_bit_count_minus1[ frmIdx ] |
| pfh_2d_shift_v_bit_count_minus1[ frmIdx ] |
| pfh_3d_shift_tangent_axis_bit_count_minus1[ frmIdx ] |
| pfh_3d_shift_bitangent_axis_bit_count_minus1[ frmIdx ] |
| pfh_3d_shift_normal_axis_bit_count_minus1[ frmIdx ] |
| pfh_lod_bit_count[ frmIdx ] | else {

| pfh_2d_shift_u_bit_count_minus1[ frmIdx ] |
| pfh_2d_shift_v_bit_count_minus1[ frmIdx ] |
| pfh_3d_shift_tangent_axis_bit_count_minus1[ frmIdx ] |
| pfh_3d_shift_bitangent_axis_bit_count_minus1[ frmIdx ] |
| pfh_3d_shift_normal_axis_bit_count_minus1[ frmIdx ] |
| pfh_lod_bit_count[ frmIdx ] | byte_alignment()

```
class PatchFrameHeader {
public:
private:
    uint8_t     frameIndex_;
    uint8_t     patchFrameParameterSetId_;
    uint32_t    type_; // this should be enum
    uint8_t     address_; /*is yet to be defined*/
    uint8_t     patchFrameOrderCntLsb_;
    bool        refPatchFrameListSpsFlag_;
    std::vector<bool>   additionalPfocLsbPresentFlag_;
    std::vector<uint32_t>  additionalPfocLsbVal_;
    bool        numRefIdxActiveOverrideFlag_;
    uint8_t     numRefIdxActiveMinus1_;
    uint8_t     interPredictPatch2dShiftUBitCountMinus1_;
    uint8_t     interPredictPatch2dShiftVBitCountMinus1_;
    uint8_t     interPredictPatch3dShiftTangentAxisBitCountMinus1_;
    uint8_t     interPredictPatch3dShiftBitangentAxisBitCountMinus1_;
    uint8_t     interPredictPatch3dShiftNormalAxisBitCountMinus1_;
    uint8_t     interPredictPatchLodBitCount_;
    bool        interPredictPatch2dShiftUBitCountFlag_;
    bool        interPredictPatch2dShiftVBitCountFlag_;
    bool        interPredictPatch3dShiftTangentAxisBitCountFlag_;
    bool        interPredictPatch3dShiftBitangentAxisBitCountFlag_;
    bool        interPredictPatch3dShiftNormalAxisBitCountFlag_;
    bool        interPredictPatchLodBitCountFlag_;
};
```

| pfh_type | Name of pfh_type |
|---|---|
| 0 | P (P patch frame) |
| 1 | I (I patch frame) |

Fig. 9

```
void patchDataUnit( PCCContext& context, PCCBitstream& bitstream, size_t frameIndex, size_t patchIndex )

patch_mode == P_SKIP
    Do nothing
patch_mode == I_INTRA || patch_mode == P_INTRA
```

| pid_override_geometry_patch_ flag[ frmIdx ][ p ] → ae(v) | pid_geometry_patch_parameter_ set_id[ frmIdx ][ p ] → ae(v) | pid_override_attribute_patch_ flag[ frmIdx ][ p ][ i ] → ae(v) | pid_attribute_patch_parameter_ set_id[ frmIdx ][ p ][ i ] → ae(v) | patch_data_ unit(frmIdx, p) |
|---|---|---|---|---|

```
patch_mode == P_INTER
```

| delta_patch_data_unit( frmIdx, p ) |
|---|

```
patch_mode == I_PCM || patch_mode == P_PCM
```

| pcm_patch_data_unit( frmIdx, p ) |
|---|

```
patch_mode == I_HOMOGRAPHY || patch_mode == P_HOMOGRAPHY
```

| homography_patch_data_unit( frmIdx, p ) |
|---|

```
class PatchInformationData {
public:
private:
    bool                    overrideGeometryPatchFlag_;
    uint8_t                 geometryPatchParameterSetId_;
    std::vector<bool>       overrideAttributePatchFlag_;      // size is number of attributes
    std::vector<uint8_t>    attributePatchParameterSetId_;    // size is number of attributes
    PatchDataUnit           patchDataUnit_;
    DeltaPatchDataUnit      deltaPatchDataUnit_;
    PCMPatchDataUnit        pcmPatchDataUnit_;
    HomographyPatchDataUnit homographyPatchDataUnit_;
};
```

```
void deltaPatchDataUnit( DeltaPatchDataUnit& dpdu, PatchFrameHeader& pfh, PCCContext& context, PCCBitstream& bitstream, o3dgc::Arithmetic_Codec&
arithmeticEncoder );
```

| dpdu_patch_index[ frmIdx ]<br>[ patchIndex ] → ae(v) | dpdu_2d_shift_u[ frmIdx ]<br>[ patchIndex ] → ae(v) | dpdu_2d_shift_v[ frmIdx ]<br>[ patchIndex ] → ae(v) | dpdu_2d_delta_size_u[ frmIdx ]<br>[ patchIndex ] → ae(v) |
|---|---|---|---|
| dpdu_2d_delta_size_<br>v[ frmIdx ][ patchIndex ] → ae(v) | dpdu_3d_shift_tangent_<br>axis[ frmIdx ][ patchIndex ] → ae(v) | dpdu_3d_shift_bitangent_<br>axis[ frmIdx ][ patchIndex ] → ae(v) | dpdu_3d_shift_normal_axis[ frmIdx ]<br>[ patchIndex ] → ae(v) |

| dpdu_projection_model[ frmIdx ]<br>[ patchIndex ] → ae(v) |   |   |   |   |   |   |   |   |   |   |   |   |   |   |   |   |   |   |   |   |   |   |   |   |
|---|---|---|---|---|---|---|---|---|---|---|---|---|---|---|---|---|---|---|---|---|---|---|---|---|
| 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | dpdu_patch_index[ frmIdx ][ p ] plus p specifies the index, PredIdx, of the patch in the patch frame with index RefIdx that corresponds to the first patch frame in the reference patch frame list.

```
class DeltaPatchDataUnit {
public:
private:
    uint8_t     dpduPatchIndex_;
    int64_t     dpdu2DDeltaShiftU_ ;   // sizes need to be determined
    int64_t     dpdu2DDeltaShiftV_;
    int64_t     dpdu2DDeltaSizeU_;
    int64_t     dpdu2DDeltaSizeV_;
    int64_t     dpdu3DDeltaShiftTangentAxis_;
    int64_t     dpdu3DDeltaShiftBiTangentAxis_;
    int64_t     dpdu3DDeltaShiftNormalAxis_;
    PCCAxis3    dpduNormalAxis_;
    bool        dpduOrientationSwapFlag_;
    uint8_t     dpduLod_;
    bool        dpduProjectionMode_;
};
```

Fig. 13

```
void pcmPatchDataUnit( PCMPatchDataUnit& ppdu, PatchFrameHeader& pfh, PCCContext& context, PCCBitstream& bitstream,
o3dgc::Arithmetic_Codec& arithmeticEncoder );
```

| ppdu_patch_in_pcm_video_ flag[ frmIdx ][ p ] → ae(v) | ppdu_2d_shift_ u[ frmIdx ][ p ] → ae(v) | ppdu_2d_shift_ v[ frmIdx ][ p ] → ae(v) | ppdu_2d_delta_size_ u[ frmIdx ][ p ] → ae(v) | ppdu_2d_delta_size_ v[ frmIdx ][ p ] → ae(v) | ppdu_pcm_points[ frmIdx ][ p ] → ae(v) |
|---|---|---|---|---|---|

```
class PCMPatchDataUnit {
public:
private:
  bool      ppduPatchInPcmVideoFlag_ ;
  uint64_t  ppdu2DShiftU_ ;
  uint64_t  ppdu2DShiftV_ ;
  int64_t   ppdu2DDeltaSizeU_ ;
  int64_t   ppdu2DDeltaSizeV_ ;
  uint32_t  ppduPcmPoints_ ;
};
```

Fig. 14

$$\begin{bmatrix} x \\ y \\ z \\ w \end{bmatrix} = \begin{bmatrix} H_{0,0} & H_{0,0} & H_{0,2} & H_{0,3} \\ H_{1,0} & H_{1,1} & H_{1,2} & H_{1,3} \\ H_{2,0} & H_{2,1} & H_{2,2} & H_{2,3} \\ H_{3,0} & H_{3,1} & H_{3,2} & H_{3,3} \end{bmatrix} \begin{bmatrix} u \\ v \\ \text{gFrame(u, v)} \\ 1 \end{bmatrix}$$

$$\begin{bmatrix} \text{recPc[pointCnt ][}x\text{]} \\ \text{recPc[pointCnt ][}y\text{]} \\ \text{recPc[pointCnt ][}z\text{]} \end{bmatrix} = \begin{bmatrix} x/w \\ y/w \\ z/w \end{bmatrix}$$

Fig. 16

POINT CLOUD CODING USING HOMOGRAPHY TRANSFORM

CROSS-REFERENCE TO RELATED APPLICATION(S)

This application claims priority under 35 U.S.C. § 119(e) of the U.S. Provisional Patent Application Ser. No. 62/794,091, filed Jan. 18, 2019 and titled, "POINT CLOUD CODING USING HOMOGRAPHY TRANSFORM," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

SUMMARY OF THE INVENTION

A method of point cloud coding using homography transform sends the homography transform of the 3D patches, instead of the explicit projection values (such as bounding boxes and patch orientation, rotation). The method has a more compact notation, is more efficient in terms of transmission, and allows for a faster decoding, particularly in cases where the 3D points will be reprojected.

In one aspect, a method programmed in a non-transitory memory of a device comprises acquiring three dimensional content and encoding the three dimensional content using a homography transform. Encoding the three dimensional content using the homography transform comprises converting the three dimensional content to two dimensional content. Encoding the three dimensional content using the homography transform comprises transmitting homography transform coefficients of three dimensional to two dimensional transforms. Encoding the three dimensional content using the homography transform comprises computing a homography matrix. The homography matrix is computed from three matrices. The three matrices comprise a viewing matrix, a projection matrix and a viewport matrix. The viewing matrix represents a camera, the projection matrix represents pixels in a sensor of the camera, and the viewport matrix represents a transformation of the pixels in the camera to the pixels in an image.

In another aspect, an apparatus comprises a non-transitory memory for storing an application, the application for: acquiring three dimensional content and encoding the three dimensional content using a homography transform and a processor coupled to the memory, the processor configured for processing the application. Encoding the three dimensional content using the homography transform comprises converting the three dimensional content to two dimensional content. Encoding the three dimensional content using the homography transform comprises transmitting homography transform coefficients of three dimensional to two dimensional transforms. Encoding the three dimensional content using the homography transform comprises computing a homography matrix. The homography matrix is computed from three matrices. The three matrices comprise a viewing matrix, a projection matrix and a viewport matrix. The viewing matrix represents a camera, the projection matrix represents pixels in a sensor of the camera, and the viewport matrix represents a transformation of the pixels in the camera to the pixels in an image.

In another aspect, a system comprises one or more cameras for acquiring three dimensional content and an encoder for encoding the three dimensional content using a homography transform. Encoding the three dimensional content using the homography transform comprises converting the three dimensional content to two dimensional content. Encoding the three dimensional content using the homography transform comprises transmitting homography transform coefficients of three dimensional to two dimensional transforms. Encoding the three dimensional content using the homography transform comprises computing a homography matrix. The homography matrix is computed from three matrices. The three matrices comprise a viewing matrix, a projection matrix and a viewport matrix. The viewing matrix represents a camera, the projection matrix represents pixels in a sensor of the camera, and the viewport matrix represents a transformation of the pixels in the camera to the pixels in an image.

BRIEF DESCRIPTION OF THE DRAWINGS

FIG. 8 illustrates an exemplary patch frame layer unit syntax according to some embodiments.

FIG. 9 illustrates an exemplary patch frame header syntax according to some embodiments.

FIG. 11 illustrates an exemplary patch information data syntax according to some embodiments.

FIG. 12 illustrates an exemplary patch data unit syntax according to some embodiments.

FIG. 13 illustrates an delta patch data unit syntax according to some embodiments.

FIG. 14 illustrates an exemplary PCM patch data unit syntax according to some embodiments.

FIG. 16 illustrates matrices for reconstruction of a point cloud from homography patches according to some embodiments.

DETAILED DESCRIPTION OF THE PREFERRED EMBODIMENT

The state-of-the-art in point cloud compression using video encoders represent point clouds as 3D patches and encode a 2D image formed by the projection of geometry and attributes into a 2D canvas. The mapping of 3D points to 2D points is made considering several different options, such as direction plane and patch orientation. Currently, the point cloud compression standard encodes all those options in an auxiliary data structure and sends this to the decoder, which reconstructs the 3D points. Since the points will be used for rendering, another transform will be applied to the points to reproject them. The method described herein transmits the homography transforms directly, which could enable fast rendering of point clouds. Moreover, the method is more compact in terms of compression efficiency.

Compared to the previous point cloud compression scheme, the method described herein sends the homography transform of the 3D patches, instead of the explicit projection values (such as bounding boxes and patch orientation, rotation). The method has a more compact notation, is more efficient in terms of transmission, and allows for a faster decoding, especially in cases where the 3D points will be reprojected (for example, when generating videos in mobile phones).

A novel method for encoding 3D point cloud data into 2D surfaces is described herein. The method utilizes 3D surface patches to represent point clouds and transmit a series of homography transforms of the 3D points to 2D patch surfaces.

In 3D point cloud coding using video encoders, projection from 3D to 2D is used to generate the videos that will represent the point cloud. The most efficient way of generating those videos is using 3D patches, which segments the surface of the object and uses orthogonal projection to generate segmented depth images that are bundled together and used as input of video encoders. However, together with the video images, some auxiliary information is transmitted that indicates how to reconstruct the projected points in 3D. Values such as bounding box and patch orientation, displacement, and others are currently explicitly sent in the bitstream.

As described herein, the auxiliary data to reproject the points from 2D to 3D is represented as a homography transform. Homography transforms are widely used in projective geometry to define projection between 3D points and 2D surfaces. By sending the projection matrices, the auxiliary data representation is able to be coded more efficiently. Furthermore, the homography transform is able to be used in combination with other homography transforms to reproject the points directly from 2D patches to viewing projections, avoiding the costly operations associated with the current 2D to 3D projection using explicit values.

Figure 1:
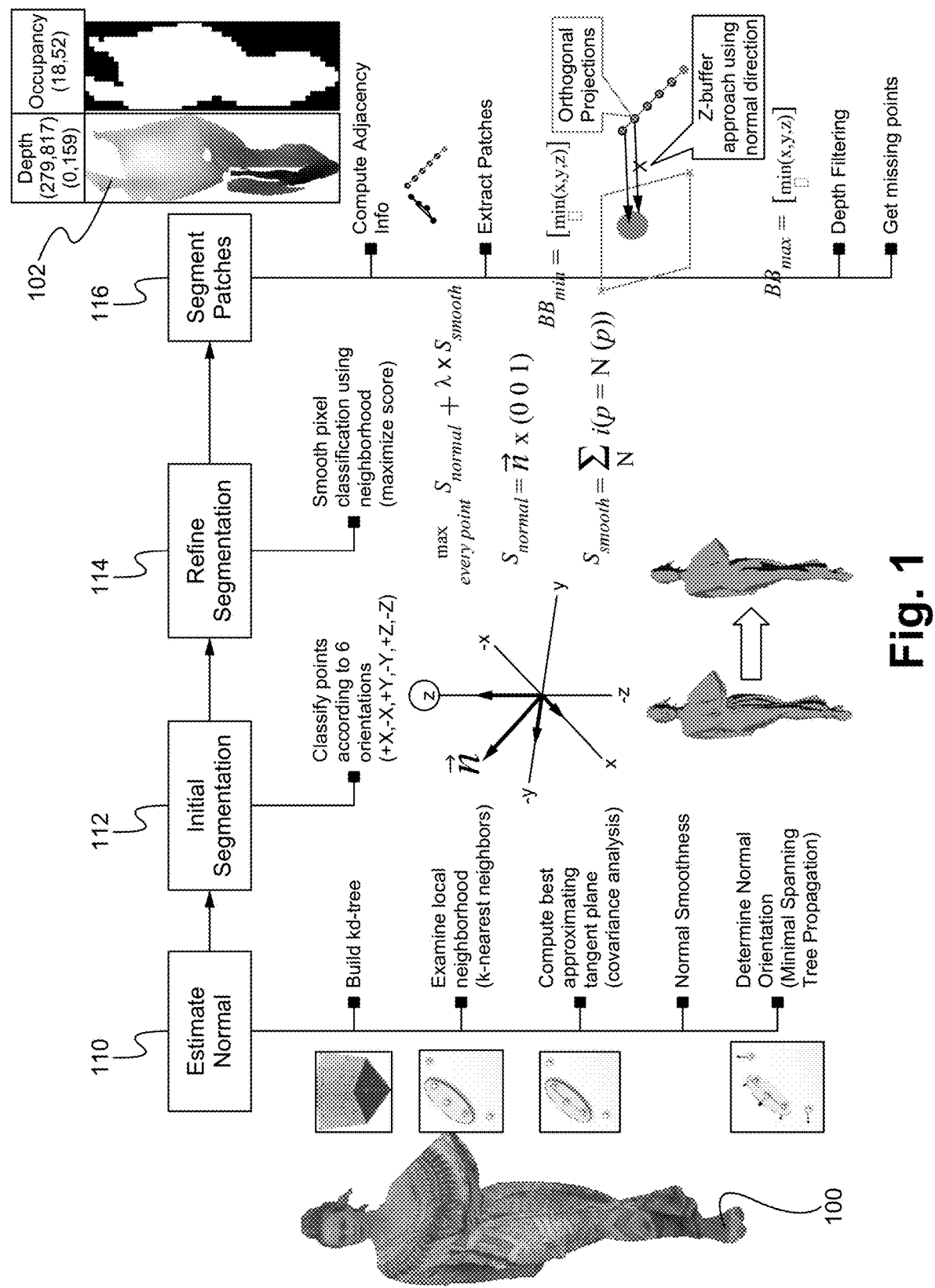
FIG. 1 illustrates a flowchart of a method of point cloud mapping according to some embodiments.

FIG. 1 illustrates a flowchart of a method of point cloud mapping according to some embodiments. A 3D point cloud 100 is acquired (e.g., captured by a camera/video camera, received from another device, downloaded). In the step 110, a normal is estimated for the 3D point cloud. Estimating the normal includes building a kd-tree, examining the local neighborhood (e.g., k-nearest neighbors), computing a best approximating tangent plane (using covariance analysis), implementing normal smoothness, and determining a normal orientation (minimal spanning tree propagation). In the step 112, initial segmentation is implemented. Initial segmentation includes classifying points according to 6 orientations (+X, −X, +Y, −Y, +Z, −Z). The initial segmentation classifies the points according to the fixed orientations. After classification, the orientations are projected onto a plane. Once a cluster of points is determined, those points are projected on the same plane. Projecting the points defines a bounding box of the points. In the step 114, the segmentation is refined. Refining the segmentation includes smooth pixel classification using the neighborhood (e.g., to maximize a specified score). In the step 116, patches are segmented. Segmenting the patches includes computing adjacency information, extracting patches, implementing depth filtering and locating missed points. The 3D point cloud mapping results in a 2D image 102. In some embodiments, fewer or additional steps are implemented. In some embodiments, the order of the steps is modified.

Figure 2:
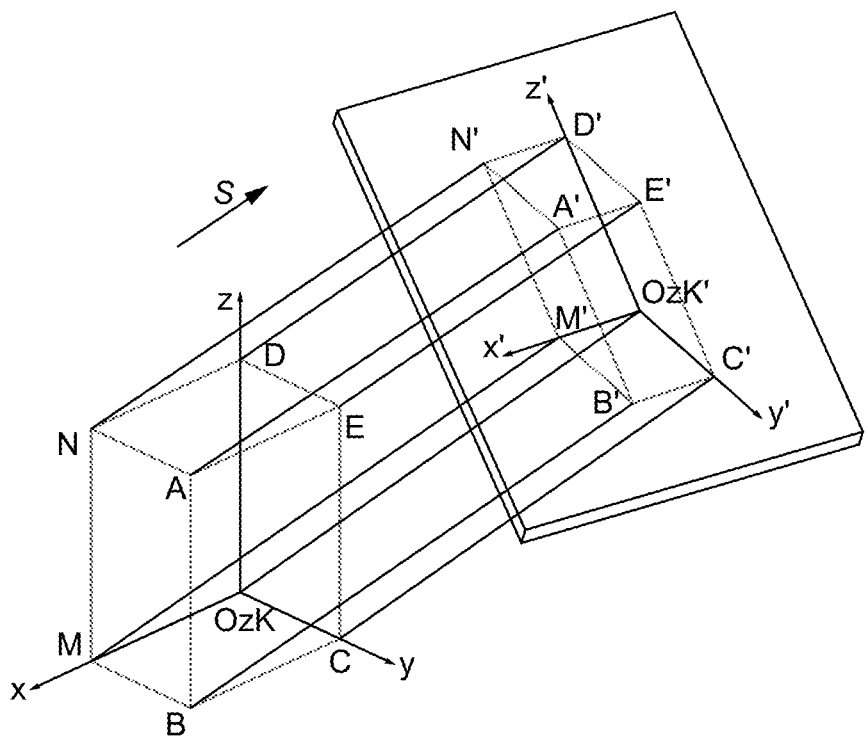
FIG. 2 illustrates a diagram of a projection for segmentation according to some embodiments.

FIG. 2 illustrates a diagram of a projection for segmentation according to some embodiments. Unlike previous implementations which only allowed projections on surfaces parallel to x, y, z axes, the method described herein is able to be projected on a plane at any position by using homography transforms. Homography transforms (or transformations) map 3D points into 2D (and vice versa).

A matrix for orthographic projection is able to be defined by a 6-tuple (left, right, bottom, top, near, far) which defines the clipping planes. These planes form a box with the minimum corner at (left, bottom, -near) and the maximum corner at (right, top, -far).

Figure 3:
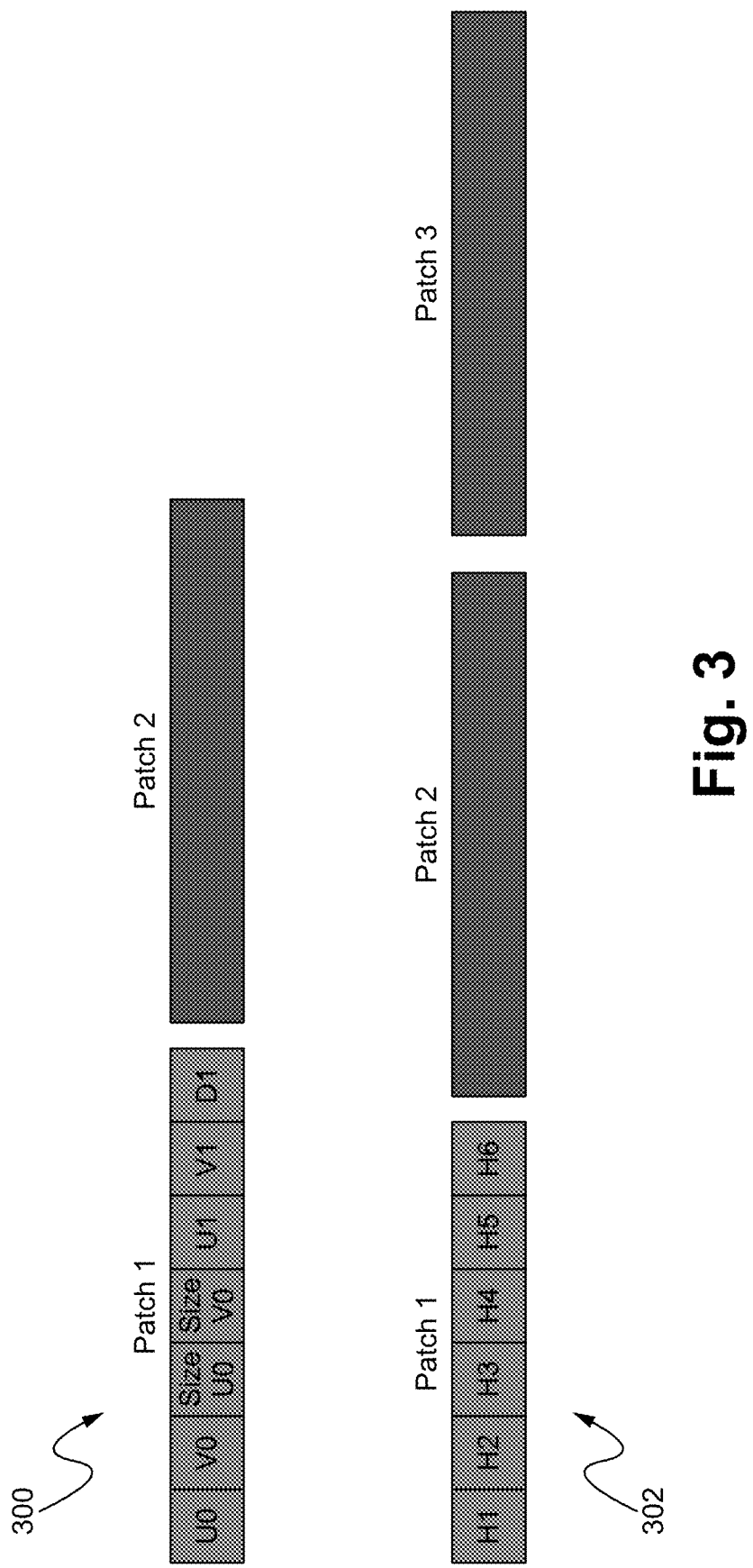
FIG. 3 illustrates representations for encoding the data according to some embodiments.

FIG. 3 illustrates representations for encoding the data according to some embodiments. The representation 300 shows how previous implementations represented the fixed projection information which includes information such as $U_0$, $V_0$, size $U_0$ and Size $V_0$ for each patch. The representation 302 is the current implementation which includes homography transform information (e.g., coefficients of the matrix shown in FIG. 2) for each patch. By using the homography transform, the system is not concerned about which plane the bounding box is being projected on.

Figure 4:
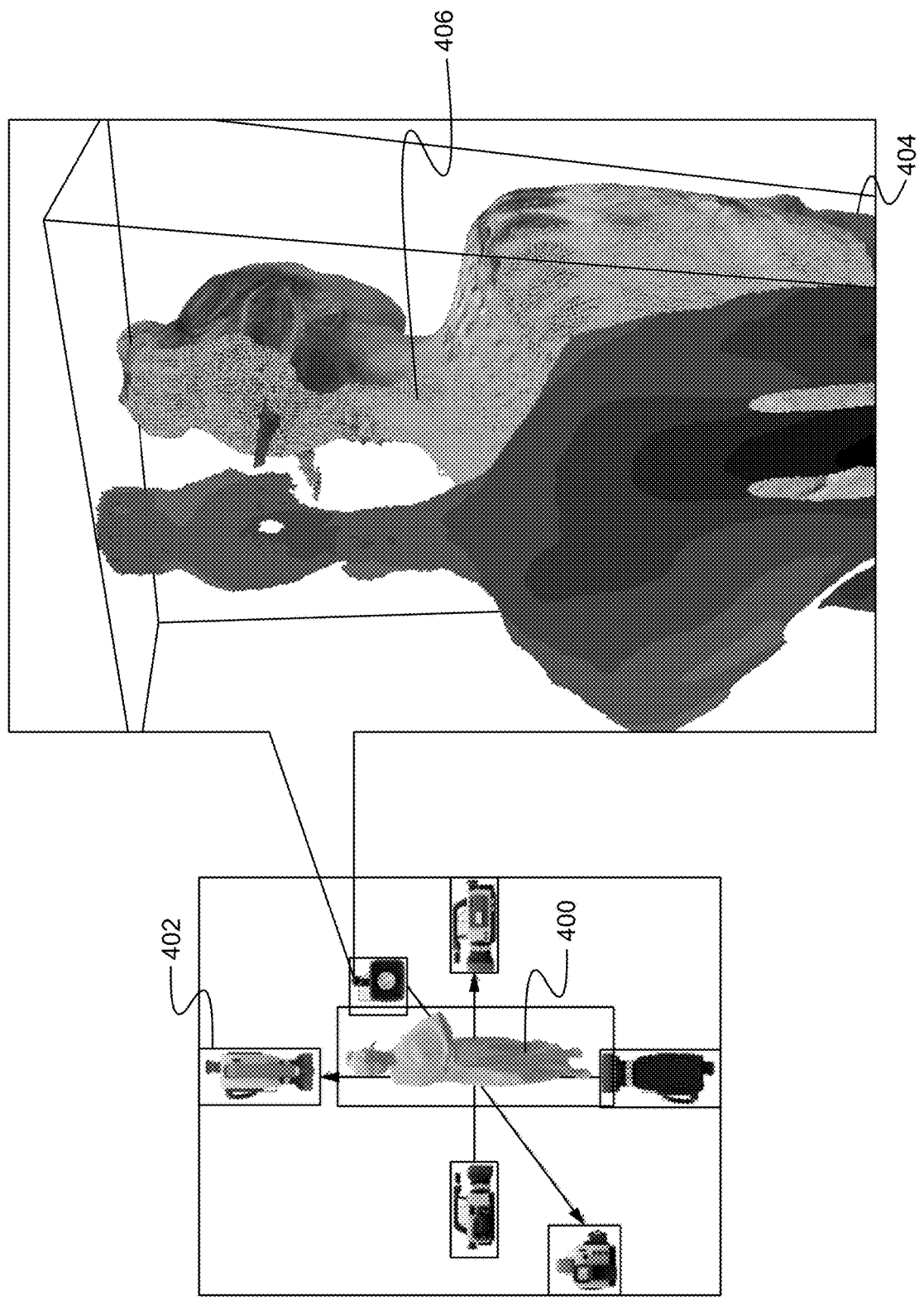
FIG. 4 illustrates a diagram for patch generation based on camera projections according to some embodiments.

FIG. 4 illustrates a diagram for patch generation based on camera projections according to some embodiments. A point cloud of a 3D model/target 400 is captured using cameras 402. In some embodiments, the cameras 402 are positioned along the x, y and z axes. The point cloud is acquired, and patches are segmented. Points that have similar characteristics are located (e.g., all of the points in the mesh 406 in the projected image 404) and projected to the same plane. The 3D position is the distance from the point to the surface or mesh 406 which is encoded in the projected image 404. An index is sent indicating which of the planes are selected (e.g., +X plane) which is used to generate a bounding box. All of the information is able to be represented as a homography transform.

Figure 5:
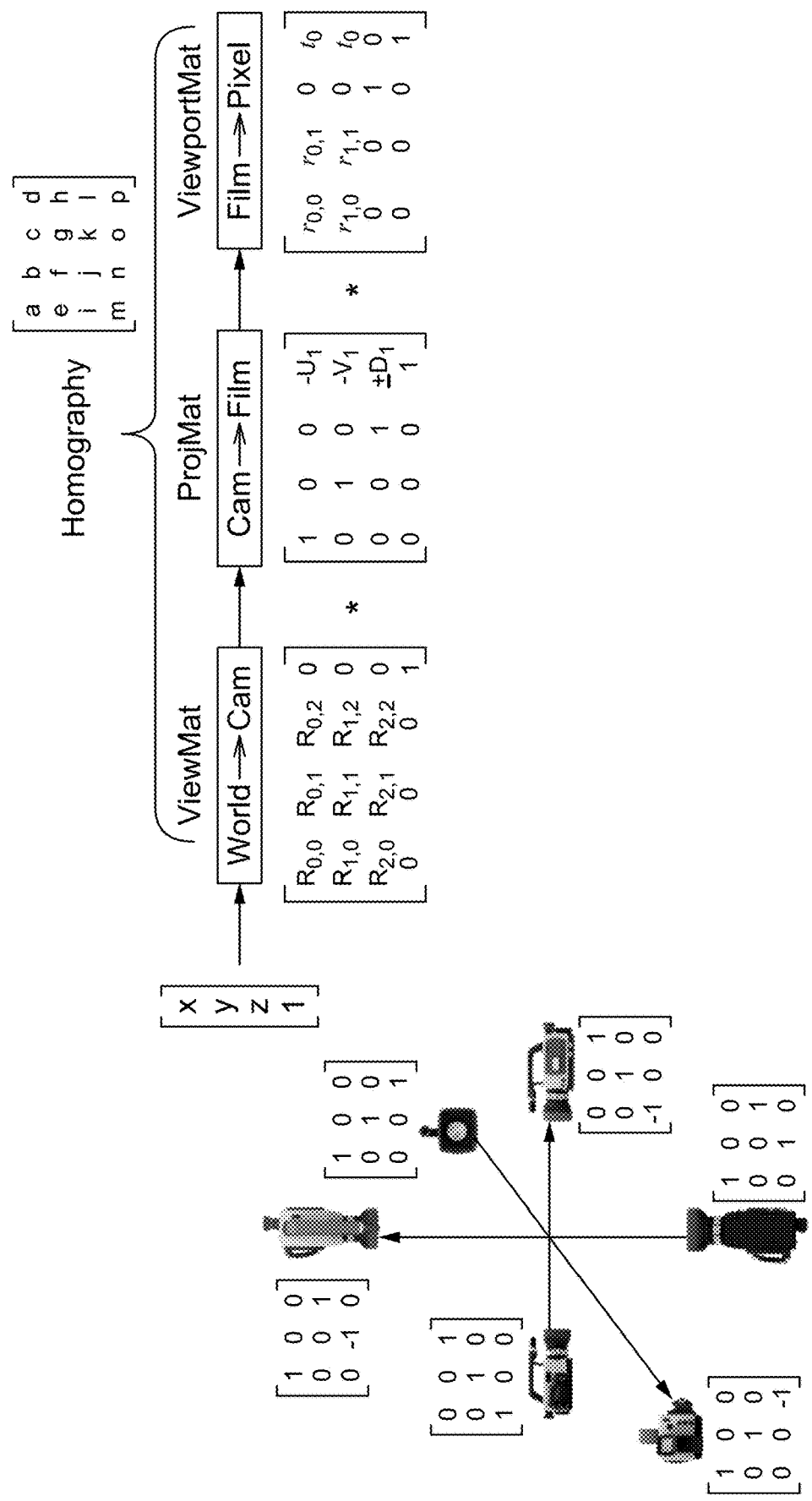
FIG. 5 illustrates a diagram of how a homography transform is constructed according to some embodiments.

FIG. 5 illustrates a diagram of how a homography transform is constructed according to some embodiments. The homography transform is three matrices (e.g., ViewMat, ProjMat and ViewportMat) multiplied together. The matrices are generated based on the rotation of the camera (e.g., $R_{0,0}$) which correlate to the individual camera matrices. Operations (e.g., Proj Matrix) are able to shift the projection according to values such as $U_1$, $V_1$, and $D_1$. One of the matrices (e.g., Viewport Matrix) determines a surface and maps the surface to a 2D canvas.

The Viewing Matrix (ViewMat) represents the camera, the Projection Matrix (ProjMat) represents the pixels in the camera sensor, and the Viewport Matrix (ViewportMat) represents the transformation of the pixels in the camera to the pixels in the image. The homography transform is able to be applied to the 3D pixels to map the pixels to a 2D surface. Operations such as scaling, shearing, perspective projection and others are able to be implemented as well.

Figure 6:
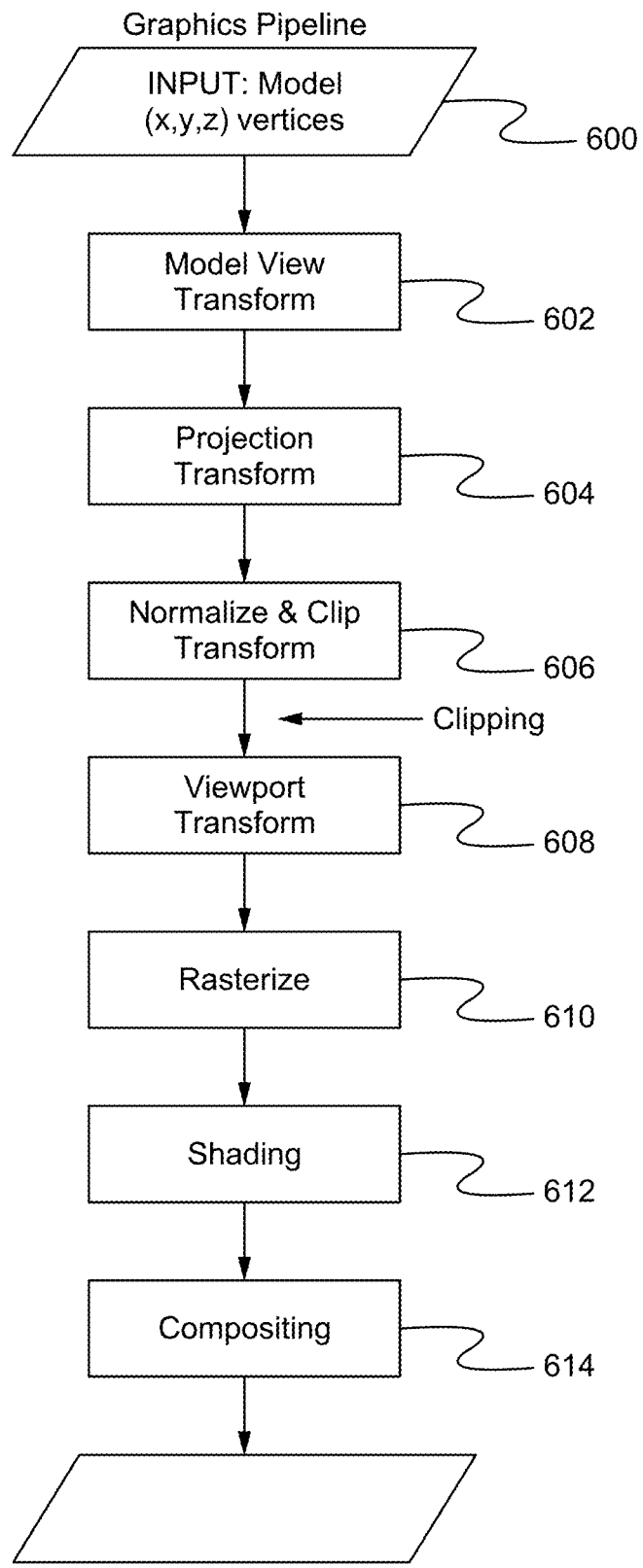
FIG. 6 illustrates a flowchart of a graphics pipeline implementing point cloud coding using the homography transform method according to some embodiments.

FIG. 6 illustrates a flowchart of a graphics pipeline implementing point cloud coding using the homography transform method according to some embodiments. In the step 600, model (x, y, z) vertices are input. In the step 602, the model view transform is applied. In the step 604, the projection transform is applied. In the step 606, the normalize and clip transform is applied. In the step 608, the viewport transform is applied. In the step 610, rasterizing is implemented. In the step 612, shading is applied. In the step 614, compositing is applied to generate a 2D representation. In some embodiments, fewer or additional steps are implemented. In some embodiments, the order of the steps is modified.

In some embodiments, coding the homography transform includes encoding each coefficient (float) separately using an arithmetic encoder.

Figure 7:
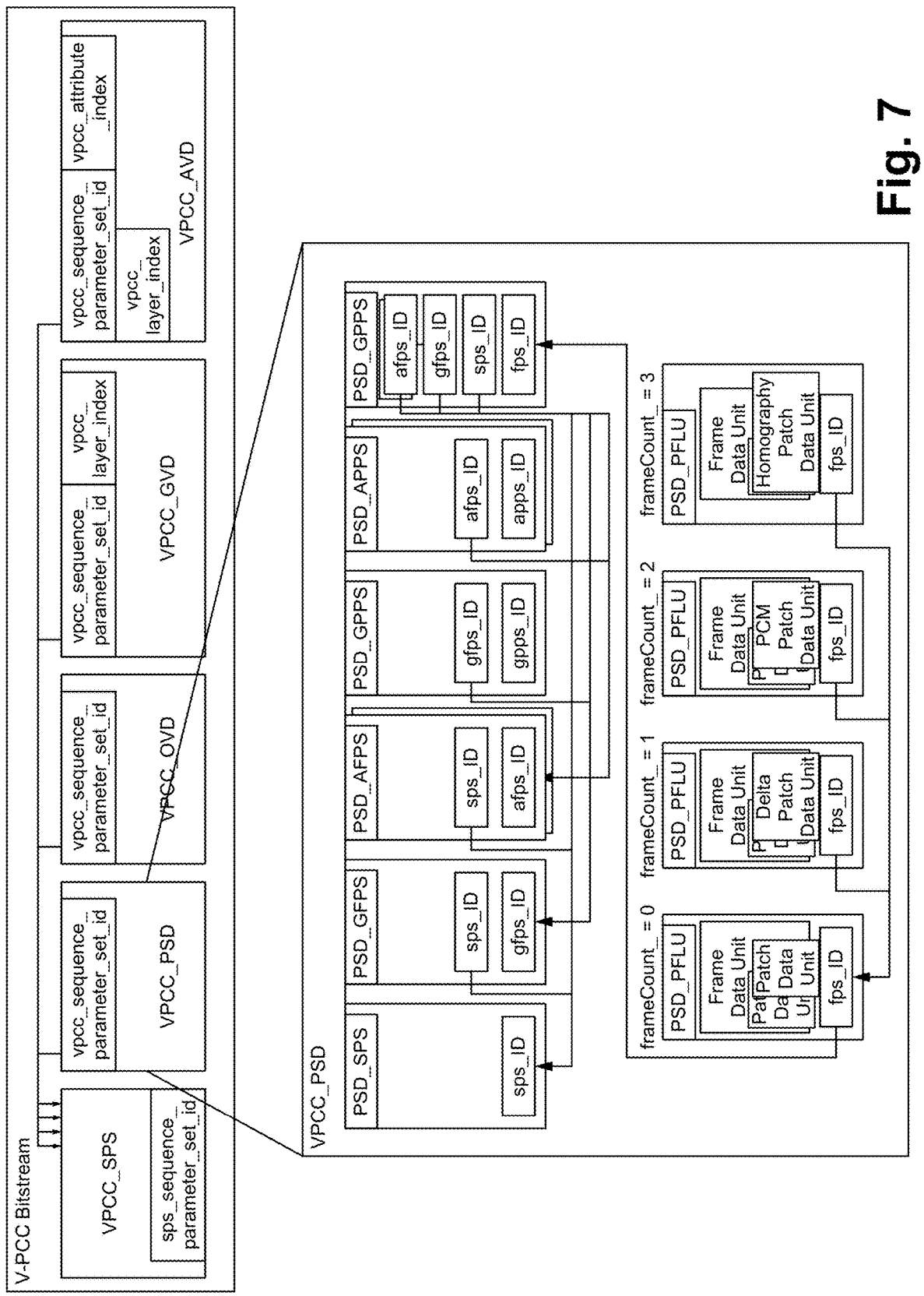
FIG. 7 illustrates an exemplary V-PCC bitstream structure according to some embodiments.

FIG. 7 illustrates an exemplary V-PCC bitstream structure according to some embodiments. FIG. 8 illustrates an exemplary patch frame layer unit syntax according to some embodiments. FIG. 9 illustrates an exemplary patch frame header syntax according to some embodiments.

Figure 10:
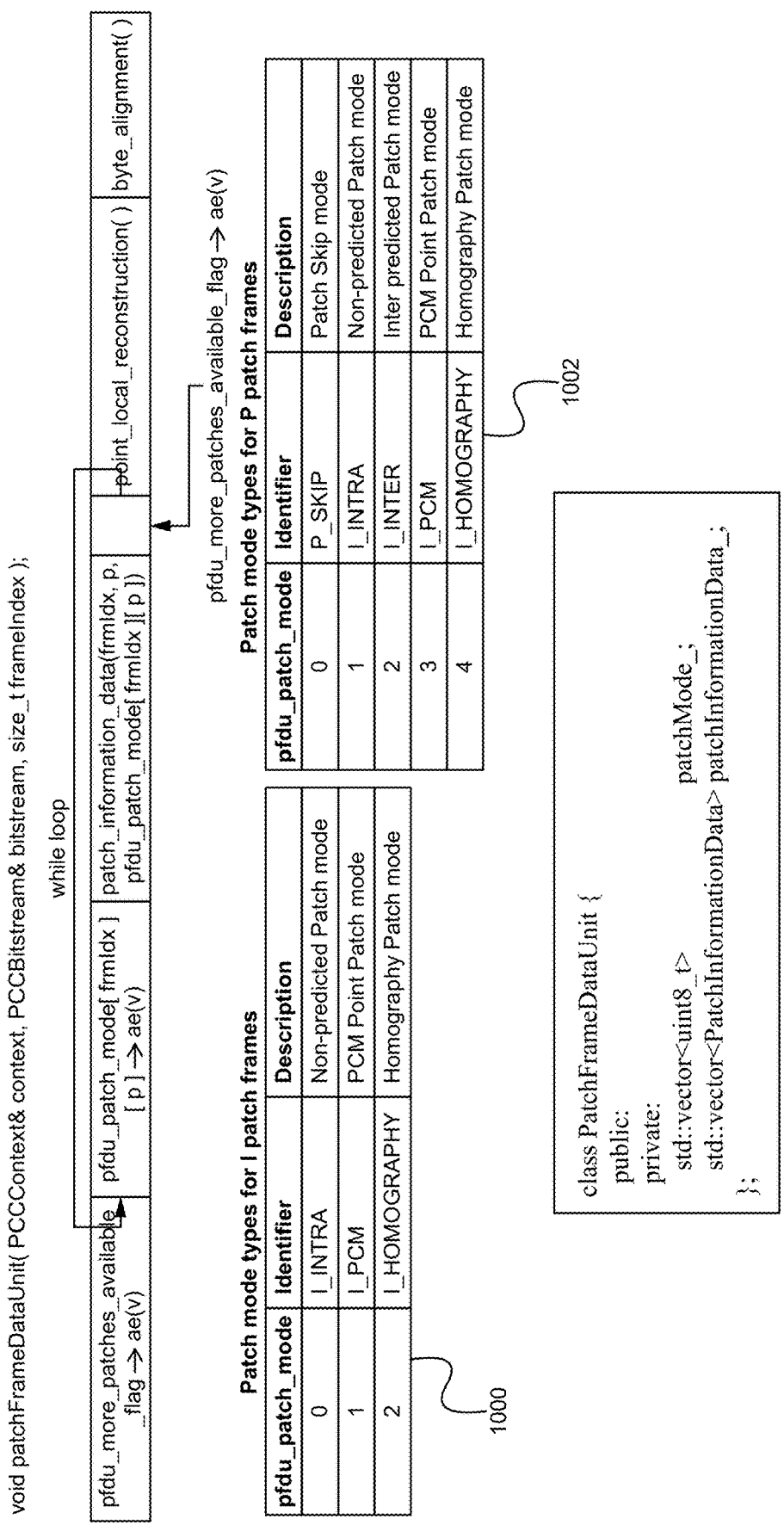
FIG. 10 illustrates an exemplary patch frame data unit syntax according to some embodiments.

FIG. 10 illustrates an exemplary patch frame data unit syntax according to some embodiments. The pfdu_patch_mode [frmIdx][p] indicates the patch mode for patch with index p in patch frame with index frmIdx. The permitted values for pfdu_patch_mode[frmIdx][p] are specified in 1000 for patch frames with pfh_type[frmIdx]=I and in 1002 for patch frames with pfh_type[frmIdx]=P.

FIG. 11 illustrates an exemplary patch information data syntax according to some embodiments.

Figure 12:
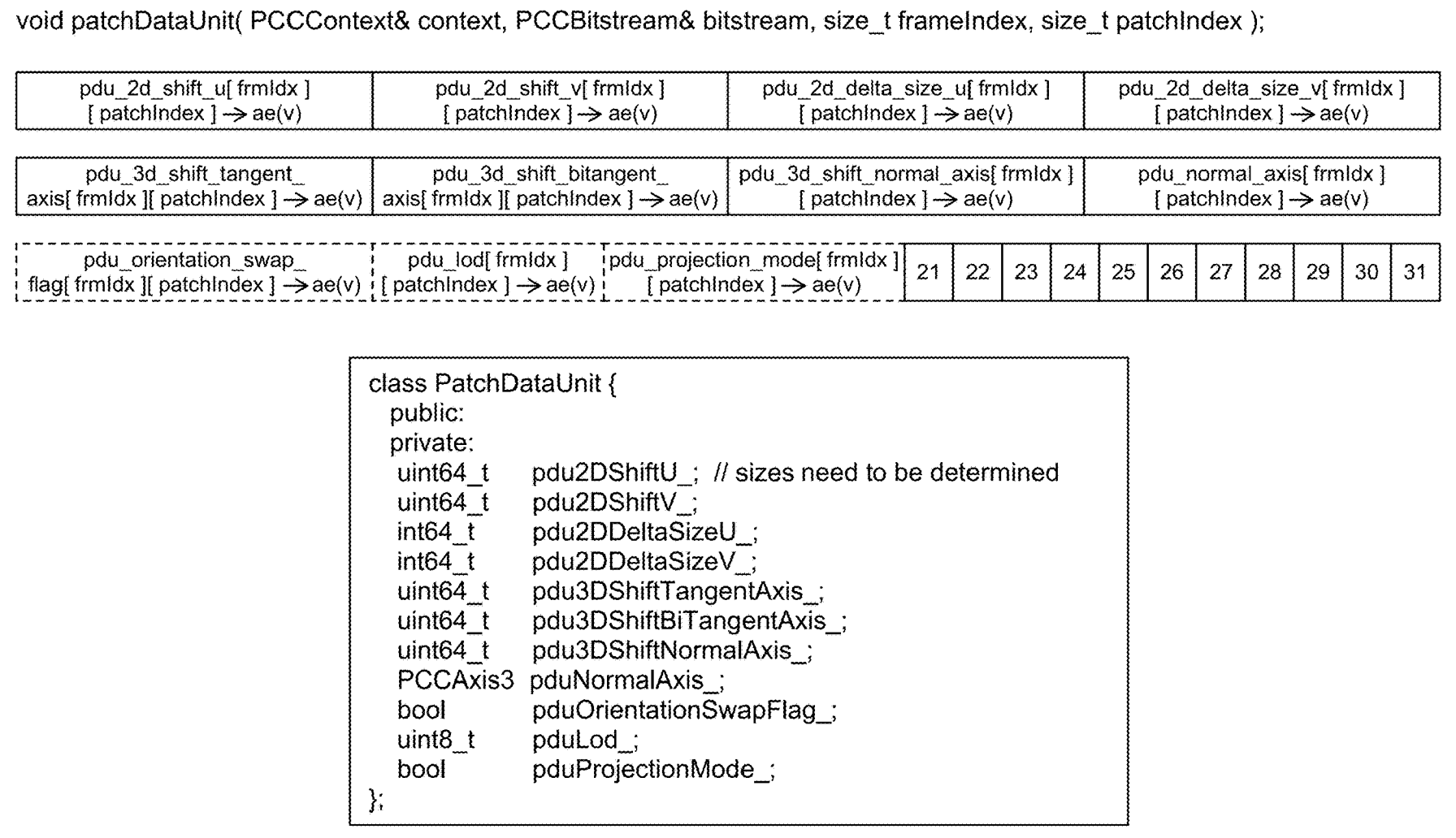

FIG. 12 illustrates an exemplary patch data unit syntax according to some embodiments. The pdu_lod[frmIdx][p] specifies the LOD scaling factor to be applied to the patch with index p of patch frame frmIdx. The reconstructed point 3D positions for patch p in frame frmIdx are to be scaled by $2^{pdu\_lod[frmIdx][p]}$ after their projection from 2D and before applying any further transformations. If pdu_lod [frmIdx][p] is not present, its value shall be inferred to be equal to 0.

The pdu_projection_mode[frmIdx][p] equal to 0 specifies that the patch with index p of patch frame frmIdx is projected on to the near projection plane. The pdu_projection_mode[frmIdx][p] equal to 1 specifies that the patch is projected on to the far projection plane. When pdu_projection_mode[frmIdx][p] is not present, its value shall be inferred to be equal to 0.

FIG. 13 illustrates an delta patch data unit syntax according to some embodiments.

FIG. 14 illustrates an exemplary PCM patch data unit syntax according to some embodiments. The ppdu_patch_in_pcm_video_flag[frmIdx][p] specifies whether the geometry and attribute data associated with the PCM coded patch p in patch frame with index frmIdx are encoded in a separate video compared to those of the intra and inter coded patches. If ppdu_patch_in_pcm_video_flag [frmIdx][p] is equal to 0, the geometry and attribute data associated with the PCM coded patch p in patch frame with index frmIdx are encoded in the same video as those of the intra and inter coded patches. If ppdu_patch_in_pcm_video_flag[frmIdx][p] if equal to 1, the geometry and attribute data associated with the PCM coded patch p in patch frame with index frmIdx are encoded in a separate video from those of the intra and inter coded patches. The ppdu_pcm_points[frmIdx][p] specifies the number of pcm points present in the PCM coded patch p in the patch frame with index frmIdx. The value of ppdu_pcm_points[frmIdx] [p] shall be in the range of 0 to (Patch2dSizeU[frmIdx] [p]*Patch2dSizeU[frmIdx][p]/3), inclusive.

Figure 15:
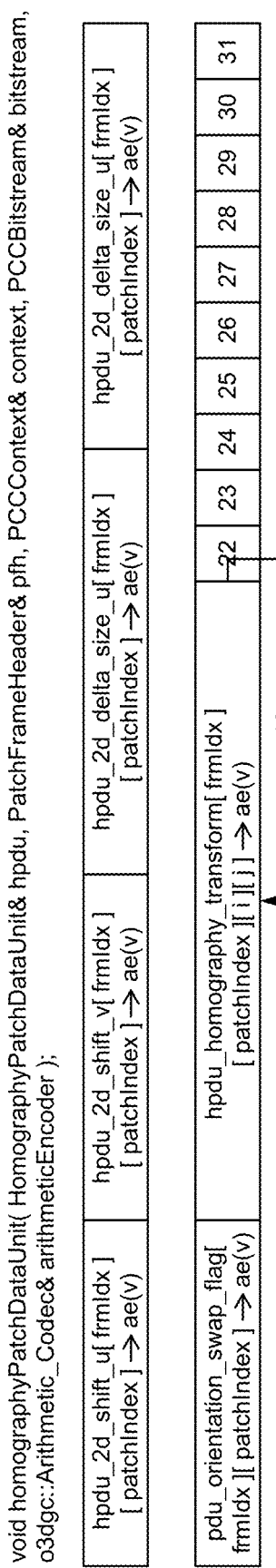
FIG. 15 illustrates an exemplary homography patch data unit syntax according to some embodiments.

FIG. 15 illustrates an exemplary homography patch data unit syntax according to some embodiments. The hpdu_2d_shift_u[frmIdx][p] specifies the x-coordinate of the top-left corner of the patch bounding box size for patch p in the patch frame with index frmIdx, expressed as a multiple of ops_occupancy_packing_block_size. The value of hpdu_2d_shift_u[frmIdx][p] shall be in the range of 0 to Min(2pfh_2d_shift_u_bit_count_minus1[frmIdx]+1−1, sps_frame_width/ops_occupancy_packing_block_size−1), inclusive. The hpdu_2d_shift_v[frmIdx][p] specifies the y-coordinate of the top-left corner of the patch bounding box size for patch p in the patch frame with index frmIdx, expressed as a multiple of ops_occupancy_packing_block_size. The value of hpdu_2d_shift_v[frmIdx][p] shall be in the range of 0 to Min (2pfh_2d_shift_v_bit_count_minus1[frmIdx]+1−1, sps_frame_height/ops_occupancy_packing_block_size−1), inclusive. The hpdu_2d_delta_size_u[frmIdx][p], when p is equal to 0, specifies the width value of the patch with index 0 in the patch frame with index frmIdx. When p is larger than 0, hpdu_2d_delta_size_u[frmIdx][p] specifies the difference of the width values of the patch with index p and the patch with index (p−1). The hpdu_2d_delta_size_v[frmIdx][p], when p is equal to 0, specifies the height value of the patch with index 0 in the patch frame with index frmIdx. When p is larger than 0, hpdu_2d_delta_size_v[frmIdx][p] specifies the difference of the height values of the patch with index p and the patch with index (p−1). The hpdu_orientation_swap_flag[frmIdx][p] indicates whether the patch orientation for patch with index p of patch frame frmIdx is used according to a table. If pdu_orientation_swap_flag[frmIdx] [p] is not present, its value shall be inferred to be equal to 0. The hpdu_homography_transform[frmIdx][patchIndex] [i][j], specifies the coefficient[i][j] of the 4×4 Homography Matrix. The homography transform allows transformation to the patch such as different patch orientation, different camera directions and others.

A decoding process for patch units coded in homography mode is implemented. Inputs to this process are the the current patch frame index, frmIdx, and the current patch index, p. The following patch related variables are first assigned given the parsed elements in the patch data unit:

$$\text{Patch2dShift}U[\text{frmIdx}][p] = \text{pdu\_2d\_shift\_}u[\text{frmIdx}][p]*\text{ops\_occupancy\_packing\_block\_size} \quad (8\text{-}6)$$

$$\text{Patch2dShift}V[\text{frmIdx}][p] = \text{pdu\_2d\_shift\_}v[\text{frmIdx}][p]*\text{ops\_occupancy\_packing\_block\_size} \quad (8\text{-}7)$$

Then the variables Patch2dSizeU[frmIdx][p] and Patch2dSizeV[frmIdx][p] are derived as follows:
If p is equal to 0, then:

$$\text{Patch2dSize}U[\text{frmIdx}][p] = \text{pdu\_2d\_delta\_size\_}u[\text{frmIdx}][p]*\text{ops\_occupancy\_packing\_block\_size} \quad (8\text{-}8)$$

$$\text{Patch2dSize}V[\text{frmIdx}][p] = \text{pdu\_2d\_delta\_size\_}v[\text{frmIdx}][p]*\text{ops\_occupancy\_packing\_block\_size} \quad (8\text{-}9)$$

Otherwise, if (p>0), then:

$$\text{Patch2dSize}U[\text{frmIdx}][p] = \text{Patch2dSize}U[\text{frmIdx}][p-1] + \text{pdu\_2d\_delta\_size\_}u[\text{frmIdx}][p]*\text{ops\_occupancy\_packing\_block\_size} \quad (8\text{-}10)$$

$$\text{Patch2dSize}V[\text{frmIdx}][p] = \text{Patch2dSize}V[\text{frmIdx}][p-1] + \text{pdu\_2d\_delta\_size\_}v[\text{frmIdx}][p]*\text{ops\_occupancy\_packing\_block\_size} \quad (8\text{-}11)$$

for (i=0;i<4;i++){ for (j=0;j<4;j++){

Homography[frmIdx][p][i][j]=hpdu_homography_transform[frmIdx][p][i][j]}}

FIG. 16 illustrates matrices for reconstruction of a point cloud from homography patches according to some embodiments. The output point cloud is simply generated by multiplying the homography transform to a vector in homogenous coordinate notation formed by the position in the canvas and the depth value.

Another way to signal the homography transform is to add a flag to the patch data unit and signal that more information will be sent, namely the homography transform coefficients.

Figure 17:
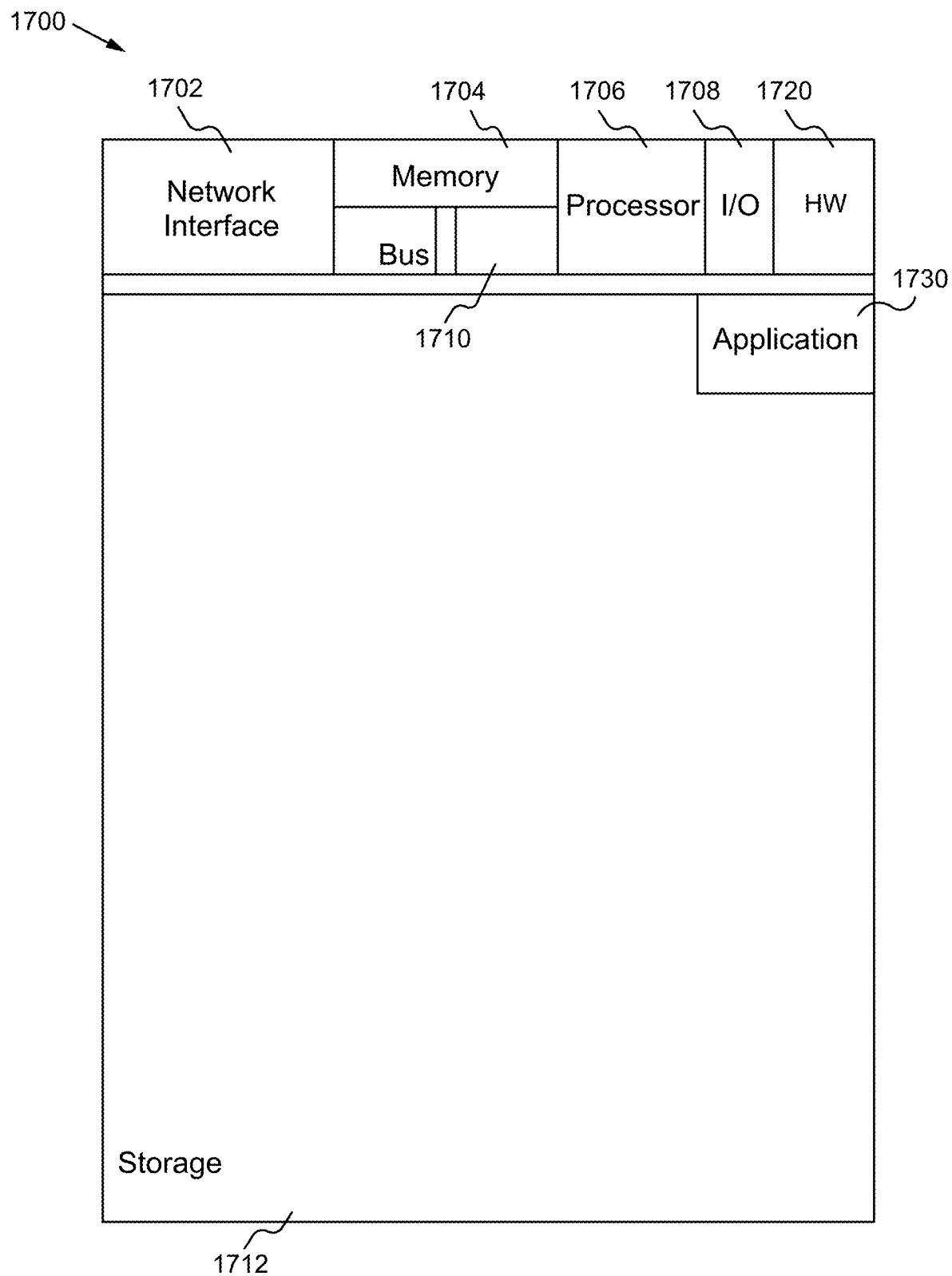
FIG. 17 illustrates a block diagram of an exemplary computing device configured to implement the point cloud coding using homography transform according to some embodiments.

FIG. 17 illustrates a block diagram of an exemplary computing device configured to implement the point cloud coding using homography transform according to some embodiments. The computing device 1700 is able to be used to acquire, store, compute, process, communicate and/or display information such as images and videos including 3D content. The computing device 1700 is able to implement any of the point cloud coding aspects. In general, a hardware structure suitable for implementing the computing device 1700 includes a network interface 1702, a memory 1704, a processor 1706, I/O device(s) 1708, a bus 1710 and a storage device 1712. The choice of processor is not critical as long as a suitable processor with sufficient speed is chosen. The memory 1704 is able to be any conventional computer memory known in the art. The storage device 1712 is able to include a hard drive, CDROM, CDRW, DVD, DVDRW, High Definition disc/drive, ultra-HD drive, flash memory card or any other storage device. The computing device 1700 is able to include one or more network interfaces 1702. An example of a network interface includes a network card connected to an Ethernet or other type of LAN. The I/O device(s) 1708 are able to include one or more of the following: keyboard, mouse, monitor, screen, printer, modem, touchscreen, button interface and other devices. Point cloud coding application(s) 1730 used to implement the point cloud coding are likely to be stored in the storage device 1712 and memory 1704 and processed as applications are typically processed. More or fewer components shown in FIG. 17 are able to be included in the computing device 1700. In some embodiments, point cloud coding hardware 1720 is included. Although the computing device 1700 in FIG. 17 includes applications 1730 and hardware 1720 for the point cloud coding, the point cloud coding is able to be implemented on a computing device in hardware, firmware, software or any combination thereof. For example, in some embodiments, the point cloud coding applications 1730 are programmed in a memory and executed using a processor. In another example, in some embodiments, the point cloud coding hardware 1720 is programmed hardware logic including gates specifically designed to implement the point cloud coding.

In some embodiments, the point cloud coding application(s) 1730 include several applications and/or modules. In some embodiments, modules include one or more sub-modules as well. In some embodiments, fewer or additional modules are able to be included.

In some embodiments, the point cloud coding hardware 1720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud coding using homography transform method, a device acquires or receives 3D content and processes and/or sends the content in an optimized manner to enable proper, efficient display of the 3D content. The point cloud coding is able to be implemented with user assistance or automatically without user involvement.

In operation, the point cloud coding using homography transform method sends the homography transform of the 3D patches, instead of the explicit projection values (such as bounding boxes and patch orientation, rotation). The method has a more compact notation, is more efficient in terms of transmission, and allows for a faster decoding, particularly in cases where the 3D points will be reprojected (for example, when generating videos in mobile phones). Tests have shown that performance is improved using the point cloud coding with homography transform method compared to previous implementations.

Other advantages of using the homography transform (patch) include: utilizing any direction (not only the 6 axis-aligned orientations) (e.g., 10 projection is able to be modeled with the homography transform); different types of cameras are able to be used (orthographic×perspective camera used in depth and texture), generating a backward-compatible bitstream that is compatible with 2D texture (decode attribute only), 2D+depth texture (decode attribute and homography patch), and point cloud (decode all); and the homography patch is compatible with current patch definitions (e.g., the homography transform is able to be obtained using the current notation), intra/inter capability.

Some Embodiments of Point Cloud Coding Using Homography Transform

1. A method programmed in a non-transitory memory of a device comprising:
   acquiring three dimensional content; and
   encoding the three dimensional content using a homography transform.
2. The method of clause 1 wherein encoding the three dimensional content using the homography transform comprises converting the three dimensional content to two dimensional content.
3. The method of clause 1 wherein encoding the three dimensional content using the homography transform comprises transmitting homography transform coefficients of three dimensional to two dimensional transforms.
4. The method of clause 1 wherein encoding the three dimensional content using the homography transform comprises computing a homography matrix.
5. The method of clause 4 wherein the homography matrix is computed from three matrices.
6. The method of clause 5 wherein the three matrices comprise a viewing matrix, a projection matrix and a viewport matrix.
7. The method of clause 6 wherein the viewing matrix represents a camera, the projection matrix represents pixels in a sensor of the camera, and the viewport matrix represents a transformation of the pixels in the camera to the pixels in an image.
8. An apparatus comprising:
   a non-transitory memory for storing an application, the application for:
      acquiring three dimensional content; and
      encoding the three dimensional content using a homography transform; and
   a processor coupled to the memory, the processor configured for processing the application.
9. The apparatus of clause 8 wherein encoding the three dimensional content using the homography transform comprises converting the three dimensional content to two dimensional content.
10. The apparatus of clause 8 wherein encoding the three dimensional content using the homography transform comprises transmitting homography transform coefficients of three dimensional to two dimensional transforms.
11. The apparatus of clause 8 wherein encoding the three dimensional content using the homography transform comprises computing a homography matrix.
12. The apparatus of clause 11 wherein the homography matrix is computed from three matrices.
13. The apparatus of clause 12 wherein the three matrices comprise a viewing matrix, a projection matrix and a viewport matrix.
14. The apparatus of clause 13 wherein the viewing matrix represents a camera, the projection matrix represents pixels in a sensor of the camera, and the viewport matrix represents a transformation of the pixels in the camera to the pixels in an image.
15. A system comprising:
   one or more cameras for acquiring three dimensional content; and
   an encoder for encoding the three dimensional content using a homography transform.
16. The system of clause 15 wherein encoding the three dimensional content using the homography transform comprises converting the three dimensional content to two dimensional content.
17. The system of clause 15 wherein encoding the three dimensional content using the homography transform comprises transmitting homography transform coefficients of three dimensional to two dimensional transforms.
18. The system of clause 15 wherein encoding the three dimensional content using the homography transform comprises computing a homography matrix.
19. The system of clause 18 wherein the homography matrix is computed from three matrices.
20. The system of clause 19 wherein the three matrices comprise a viewing matrix, a projection matrix and a viewport matrix.
21. The system of clause 20 wherein the viewing matrix represents a camera, the projection matrix represents pixels in a sensor of the camera, and the viewport matrix represents a transformation of the pixels in the camera to the pixels in an image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   acquiring three dimensional content, including segmenting patches of the three dimensional content, wherein points with similar characteristics of the three dimensional content are projected to a same plane, wherein a three dimensional position is a distance from a point to a surface, and sending an index indicating which of the planes are selected to generate a bounding box; and
   encoding the three dimensional content using a homography transform, wherein encoding the three dimensional content using the homography transform comprises:
   estimating a normal including: building a kd-tree, examining a local neighborhood, computing a best approximating tangent plane using covariance analysis, implementing normal smoothness, and determining a normal orientation.
2. The method of claim 1 wherein encoding the three dimensional content using the homography transform comprises converting the three dimensional content to two dimensional content.
3. The method of claim 1 wherein encoding the three dimensional content using the homography transform comprises transmitting homography transform coefficients of three dimensional to two dimensional transforms.
4. The method of claim 1 wherein encoding the three dimensional content using the homography transform comprises computing a homography matrix.

5. The method of claim 4 wherein the homography matrix is computed from three matrices.

6. The method of claim 5 wherein the three matrices comprise a viewing matrix, a projection matrix and a viewport matrix.

7. The method of claim 6 wherein the viewing matrix represents a camera, the projection matrix represents pixels in a sensor of the camera, and the viewport matrix represents a transformation of the pixels in the camera to the pixels in an image.

8. An apparatus comprising:
a non-transitory memory for storing an application, the application for:
acquiring three dimensional content, including segmenting patches of the three dimensional content, wherein points with similar characteristics of the three dimensional content are projected to a same plane, wherein a three dimensional position is a distance from a point to a surface, and sending an index indicating which of the planes are selected to generate a bounding box; and
encoding the three dimensional content using a homography transform, wherein encoding the three dimensional content using the homography transform comprises:
estimating a normal including: building a kd-tree, examining a local neighborhood, computing a best approximating tangent plane using covariance analysis, implementing normal smoothness, and determining a normal orientation; and
a processor coupled to the memory, the processor configured for processing the application.

9. The apparatus of claim 8 wherein encoding the three dimensional content using the homography transform comprises converting the three dimensional content to two dimensional content.

10. The apparatus of claim 8 wherein encoding the three dimensional content using the homography transform comprises transmitting homography transform coefficients of three dimensional to two dimensional transforms.

11. The apparatus of claim 8 wherein encoding the three dimensional content using the homography transform comprises computing a homography matrix.

12. The apparatus of claim 11 wherein the homography matrix is computed from three matrices.

13. The apparatus of claim 12 wherein the three matrices comprise a viewing matrix, a projection matrix and a viewport matrix.

14. The apparatus of claim 13 wherein the viewing matrix represents a camera, the projection matrix represents pixels in a sensor of the camera, and the viewport matrix represents a transformation of the pixels in the camera to the pixels in an image.

15. A system comprising:
one or more cameras for acquiring three dimensional content, including segmenting patches of the three dimensional content including classifying points according to orientation, wherein the points with similar characteristics of the three dimensional content are projected to a same plane, wherein a three dimensional position is a distance from a point to a surface, and sending an index indicating which of the planes are selected to generate a bounding box; and
an encoder for encoding the three dimensional content using a homography transform, wherein encoding the three dimensional content using the homography transform comprises:
estimating a normal including: building a kd-tree, examining a local neighborhood, computing a best approximating tangent plane using covariance analysis, implementing normal smoothness, and determining a normal orientation.

16. The system of claim 15 wherein encoding the three dimensional content using the homography transform comprises converting the three dimensional content to two dimensional content.

17. The system of claim 15 wherein encoding the three dimensional content using the homography transform comprises transmitting homography transform coefficients of three dimensional to two dimensional transforms.

18. The system of claim 15 wherein encoding the three dimensional content using the homography transform comprises computing a homography matrix.

19. The system of claim 18 wherein the homography matrix is computed from three matrices.

20. The system of claim 19 wherein the three matrices comprise a viewing matrix, a projection matrix and a viewport matrix.

21. The system of claim 20 wherein the viewing matrix represents a camera, the projection matrix represents pixels in a sensor of the camera, and the viewport matrix represents a transformation of the pixels in the camera to the pixels in an image.

* * * * *